Patented July 31, 1951

2,562,407

UNITED STATES PATENT OFFICE 2,562,407

CYCLOALIPHATIC-PENICILLINS

Otto K. Behrens, Reuben G. Jones, and Quentin F. Soper, Indianapolis, Ind., and Joseph W. Corse, Lafayette, Calif., assignors to Eli Lilly and Company, Indianapolis, Ind., a corporation of Indiana No Drawing. Application May 3, 1949,
Serial No. 91,211

6 Claims. (Cl. 260—239.1)

This invention relates to antibiotic compounds and is directed to novel penicillins. This application is a continuation-in-part of our copending applications Serial Nos. 653,137, filed March 8, 1946, now Patent No. 2,479,296, and 773,489, filed September 11, 1947, now abandoned.

There are certain known penicillins comprising a group of chemically related compounds which, under suitable conditions of growth, are produced as metabolic products by a penicillin-producing mold. The complete molecular structures of these compounds had not been definitely established when said prior applications were filed but sufficient elucidation of structure had been accomplished to allow the assignment to them of the following empirical formula

wherein $R_0$ represents an organic radical which is characteristic of each individual penicillin.

These known penicillins comprise a group of penicillins of the foregoing formula including those wherein the $R_0$ radical represents a butene-1-yl, n-butyl, n-hexyl, phenyl or a p-hydroxyphenyl radical. It is known, furthermore, that in the normal fermentative production these known penicillins are formed in admixture.

The known penicillins thus identified, in view of further elucidation of the $C_{10}H_{13}N_2O_4S$ portion thereof, may be represented by the following formula

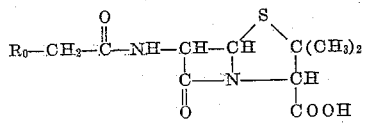

in which $R_0$ has the same meaning as set forth above.

We have made the surprising discovery that a penicillin-producing mold may be induced to produce a novel penicillin by incorporating in the nutrient medium wherein the mold is grown, a selected organic compound, called herein a precursor compound. Such selected precursor compound, although foreign to the normal metabolic requirements of the mold, may be metabolized and incorporated in substantial part in the molecule of a novel penicillin. This result is especially surprising in view of the recognized specificity of the enzyme systems whereby lower organisms maintain growth and development. It is further surprising that use of a selected precursor compound may lead to the production of a novel penicillin to the substantial exclusion of the known and normally-produced penicillins.

The present invention contemplates novel products of fermentative processes which comprise growing a penicillin-producing mold in association with a culture medium containing nutrient material and a selected precursor compound, said product as produced consisting essentially of a penicillin represented by the formula

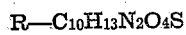

wherein R represents a hydrocarbon radical comprising a carbocyclic ring of not less than 5 and not more than 6 carbon atoms, directly jointed by one of its carbon atoms to the $C_{10}H_{13}N_2O_4S$ portion of the penicillin, such ring containing not more than one double bond, being unsubstituted on the carbon atom by which it is so joined, and containing not more than one methyl substituent on the other carbons of the ring. The R-radical thus includes and is limited to the unsubstituted cyclopentyl, cyclopentenyl, cyclohexyl, and cyclohexenyl radicals, and to said radicals substituted by a single methyl group on a carbon atom other than that by which the radical is joined to the $C_{10}H_{13}N_2O_4S$ nucleus, i. e. the methyl group is on a secondary carbon atom.

Such novel penicillins are ordinarily produced in the form of a salt, for example the sodium salt of the penicillin acid. The salt may be either the salt originally produced or a different salt to which the original product is transformed, and preferably is one of the salts ordinarily employed in the administration of the known penicillins, such as the common metal salts, for example, the sodium salt, the potassium salt, ammonium salt, the calcium salt, etc.

According to the present knowledge of the structure of penicillin, the products of this application as defined above, including both acids and salts thereof, may be represented by the following structural formula

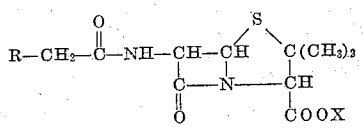

in which R has the same significance as before, and in which X represents hydrogen when the penicillin is in acid form and represents a salt-forming radical when the penicillin is in salt form, such salt-forming radicals including those customarily employed in penicillin production and therapy, such as potassium, sodium, calcium, ammonium, etc.

For convenience, we use below the empirical formula, e. g. $C_{10}H_{13}N_2O_4S$, as representing the molecular portion of the penicillin to which the R radical is attached.

The new penicillins may be named by reference to the particular R radical contained therein. Thus, for example, a penicillin wherein the R radical is the cyclohexenyl radical, is named cyclohexenyl-penicillin.

Broadly speaking, a method of producing a novel penicillin in accordance with this invention is as follows: There is provided a nutrient medium suitable for the growth of a penicillin-producing mold. To the nutrient medium is added in effective amount a precursor compound comprising an R-monosubstituted acetic acid or its equivalent. Precursor compounds useful for this purpose comprise monosubstituted acetic acids represented by the formula

R—CH₂COOH wherein R has the same meaning as before. In place of the monosubstituted acetic acids, there may be used equivalents of such acetic acids, said equivalents comprising those compounds readily converted by the mold to the monosubstituted acetic acids. Such equivalents include simple derivatives of the acids such as their salts, esters, amides and anhydrides, and may include other compounds which the mold may convert to the monosubstituted acetic acids, such as ω-R-substituted, saturated straight-chain alcohols, amines, aldehydes, and acids, containing an even number of carbon atoms, and the simple derivatives thereof.

The culture medium composition comprising nutrient material and precursor compound is inoculated with a penicillin-producing mold and the mold is grown under penicillin-producing conditions, during which growth a new penicillin is produced by the mold as a metabolic product. After mold growth, the mold mycelium is separated from the culture medium, and from the latter the novel penicillin is separated.

The isolation of the new penicillin may be effected by methods known to the art, such as adsorption and extraction, to obtain a product sufficiently pure for practical purposes. If a purer product is desired, the new penicillin may be subjected to additional methods of purification such as partition chromatography and elution, and recrystallization.

The novel penicillin desirably is recovered in the form of one of its salts, for example the sodium or potassium salt. Identification of the novel penicillin may be confirmed by methods known to the art, such methods comprising analysis, spectroscopic absorption, X-ray diffraction, and antibacterial tests.

The nutrient material used in the composition wherein the mold is grown may comprise ingredients such as water, sugars, inorganic salts and desirably one or more indeterminate compositions such as corn steep amino acids and bran. Numerous suitable nutrient media comprising materials of the type mentioned are known to the art.

During the growth of the mold the culture medium comprising nutrient material and precursor compound is maintained at a suitable temperature, for example, in the range of 20–30° C. The range of temperature which has been found to be particularly suitable is from 24–26° C. The period of time during which the mold is grown will depend upon the objective desired. Thus the mold may be grown only during the period of its maximum rate of growth before mold growth is interrupted preliminary to isolating the new penicillin. Such a period generally is from 2 to 3 days. On the other hand, the mold may be grown for a longer period of time to obtain the maximum yield of new penicillin. In such a case, mold growth is usually continued for about 4 to 5 days.

The mold may be grown under various conditions. For example, the mold may be grown without agitation of the culture medium, in which case the mold grows on the surface of the medium. Alternatively, the culture medium may be agitated by shaking or stirring during the growth of the mold in which case the mold is dispersed throughout the culture medium and grows while so dispersed.

The molds suitable for the purposes of this invention are mold organisms of the type capable of producing penicillins. Such organisms include molds of the *Penicillium notatum-chrysogenum* group as well as certain molds of the Aspergillus group. It is to be understood that not all mold strains are equally efficient for the purposes of this invention. By way of example, mold strains suitable for the purposes of this invention are those known as strains X1612 and Q-176 of the *Penicillium notatum-chrysogenum* group and strain G-147 of the *Aspergillus flavus* group.

The concentration of the precursor compounds employed in the culture medium may vary over a substantial range. The precursor compounds may be present in the culture medium in concentrations of the order of about one percent, but it is usually desirable that smaller concentrations be employed since there is no particular advantage to be gained in employing concentrations in substantial excess of those necessary to produce the optimum effect. It appears at present that the optimum concentration of the monosubstituted acetic acids and derivatives thereof lies in the range of about 0.01 to about 0.05 percent on a weight volume basis when mold strain X1612 is used, and that this optimum concentration may range upwardly when mold strain Q-176 is used.

The precursor compound may be associated with the mold and culture medium at any suitable time. Thus the materials of the nutrient medium may be inoculated with the mold and the precursor compound to be employed may be incorporated either before or after inoculation of the culture medium with the mold.

The following specific examples further illustrate the practice of this invention.

*Example 1*

The sodium salt of cyclohexyl-penicillin represented by the formula

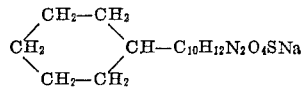

may be prepared in the following manner:

A culture medium may be prepared in the following proportions:

| | | |
|---|---|---|
| Lactose | g | 125 |
| Corn steep solids | g | 100 |
| Calcium carbonate | g | 10 |
| N-cyclohexylacetylvaline | g | 1.0 |
| Water | cc | 5000 |

The culture medium is distributed in 200 cc. portions in 1-liter Erlenmeyer flasks, sterilized, inoculated with a spore suspension of Penicillium mold, strain N. R. R. L. 1976, and stoppered with cotton plugs. The flasks are maintained at a temperature of about 23–26° C. and shaken constantly for five days. The flask contents are then filtered to remove the mold mycelium, the filtrate cooled to about 0° C., acidified to about pH 2.2 with ortho-phosphoric acid and shaken with an equal volume of amyl acetate. The amyl acetate layer is separated and extracted with three successive 100 cc. portions of cold water to which cold N/10 sodium bicarbonate solution is added during the course of each extraction until a pH of about 7.0 to 7.3 is attained in the aqueous phase. The aqueous extracts are combined, cooled to about 0° C., acidified to about pH 2.2 with ortho-phosphoric acid and extracted successively with three 100 cc. portions of ether. The ether extracts are combined, and are passed through a chromatographic type silica adsorption column about 30 mm. in diameter and 250 mm. long and containing a pH of 6.2 phosphate buffer. The silica column is developed by percolation with six 100 cc. portions of ether containing successively increasing amounts of methanol in the order of ½, 1, 1½, 2, 2½, and 3 percent.

The developed silica column is divided into about 12 equal sections and each section is eluted with three 30 cc. portions of M/15 phosphate buffer of pH 7.0. The eluates are assayed bacteriologically to determine their penicillin content. Most of the total antibiotic activity possessed by all the eluates originates in a single band in the silica column. In this example, the activity results from the presence of cyclohexyl-penicillin, and the active band occupies a position similar to that in which penicillin G is found in comparable columns. Those eluates representing the sections of the silica column comprising this major, uniform band, are combined, cooled to about 0° C., acidified to about pH 2.2 and extracted with three 50 cc. portions of chloroform. The combined chloroform extracts are passed through a silica adsorption column containing a pH 6.2 phosphate buffer. This silica column is developed by percolation with three 150 cc. portions of chloroform containing successively increasing amounts of methanol in the order of 1, 2 and 3 percent. The developed silica column is then divided into 12 equal sections and each section is eluted with three 30 cc. portions of M/15 phosphate buffer of pH 7.0. Bacteriological assay shows that substantially all the total antibiotic activity originates in a single band in the silica column. The eluates obtained by extraction of the silica column sections which comprise this band are combined, cooled to about 0° C., acidified to about pH 2.2 and extracted with three 100 cc. portions of ether. The ether extracts are combined and extracted with about 75 cc. of a cold, dilute aqueous solution of sodium hydroxide to which N/10 sodium hydroxide is added during the course of extractions so that a final pH of about 7.0 is attained in the aqueous phase. From the aqueous solution, the sodium salt of cyclohexyl-penicillin may be separated by any suitable means, for example, by freezing and evaporation in vacuo from the frozen state.

The sodium salt of cyclohexyl-penicillin thus obtained is crystallized and purified by dissolving it in 2 cc. of absolute acetone from which upon standing it separates in crystalline form. The crystalline sodium salt is isolated by centrifugation and washed with small portions of anhydrous acetone. It is dissolved in about 0.5 cc. of 92 percent aqueous acetone, the solution is filtered and the filtrate is treated with 5 cc. of absolute acetone whereupon the crystalline sodium salt of cyclohexyl-penicillin precipitates. The sodium salt of cyclohexyl-penicillin prepared according to the above procedure assayed about 1700 Oxford units per mg. when tested against Staph. aureus, strain 209P. A differential assay carried out on Staph. aureus, strain 209P, and B. subtilis, strain N. R. R. L. B–558, gave a value of about 0.79.

Instead of the separation and recovery procedure described above, other recovery processes may be used, analogous to processes for the recovery of known penicillins.

*Example 2*

The sodium salt of cyclopentyl-penicillin represented by the following formula

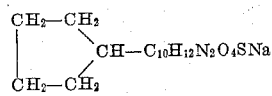

may be prepared as follows:

A culture medium is prepared in the following proportions:

| | |
|---|---|
| Corn steep liquor | g   6000 |
| Lactose | g   4500 |
| Glucose | g    750 |
| Calcium carbonate | g   1500 |
| Disodium phosphate | g    225 |
| Urea | g    150 |
| Magnesium sulfate heptahydrate | g    37.5 |
| Zinc sulfate | g    0.84 |
| Distilled water | gal   40 |

To this culture medium 31 g. of N-(2-hydroxyethyl)-cyclopentyl-acetamide are added and the mixture is sterilized. The medium is then inoculated with approximately 1.3 gallons of vegetative growth of *Penicillium chrysogenum* Q–176, and is incubated at 24° C. with aeration and stirring. After 50 hours the broth, assaying 283 units per ml., is filtered, cooled to 2° C., acidified to about pH 2 and extracted with 0.6 volume (about 29 gallons) of amyl acetate. The amyl acetate extract is treated with three successive 0.75 gallon portions of 0.3 M. phosphate buffer, pH 8.5. The buffer solution is recovered, cooled to 2° C., adjusted to pH 2.1 with 85 percent phosphoric acid, and extracted successively with 2840 ml., 1420 ml., and 945 ml. of ether. The three ether fractions, totaling 4250 ml., are combined, and contain about 39,000,000 units of penicillin.

For further purification, the combined ether extracts are passed through a 4 inch chromatographic column containing 2500 g. of silica and 1860 ml. of 1.5 M. phosphate buffer, ph 6.3. Successive 2-liter portions of ether, respectively containing 1, 2, 2.5, and 3 percent methanol are used to develop the column.

The developed column is divided into sections and each section is eluted with a total of 1000 ml. of M/15 phosphate buffer of pH 7.0, and the eluates are assayed to determine their penicillin content. About 33,500,000 units are recovered from a single band occurring near the top of the column. The eluates from this band are combined, acidified to about pH 2.1, and extracted with successive 2840 ml., 1420 ml., and 925 ml. portions of cold chloroform.

The combined chloroform extracts are passed through a silica adsorption column containing a pH 6.0 phosphate buffer, and the column is developed with 4 liters of chloroform containing 1.5 percent methanol. The major portion of the penicillin is found to be contained in a rather broad band of the column. The penicillin in this band is recovered by eluting with a buffer solution and extracting the buffer solution with ether at pH 2.1. The desired cyclopentyl-penicillin is contained in the ether extract in the form of the acid.

The acid penicillin is converted to the sodium salt by extraction with 0.1 M. sodium hydroxide solution, and the sodium salt is recovered, as by freezing and by evaporation in vacuo from the frozen state. About 27,000,000 units of amorphous cyclopentyl-penicillin are obtained. The cyclopentyl-penicillin is further purified and is obtained as a crystalline material by the crystallization procedure of Example 1. The crystalline sodium salt of cyclopentyl-penicillin, which is obtained in a yield of about 10.6 g., assays 1880 units per mg. and gives a differential assay of 0.72.

*Example 3*

Example 1 is repeated except that instead of N-cyclohexyl-acetylvaline, the precursor used is N-(2'-hydroxyethyl)-4-cyclohexyl-butyramide. In such case the penicillin obtained is the same cyclohexyl-penicillin obtained in Example 1. We believe that in the process by which the mold utilizes the precursor of this example, the 4-carbon chain of the butyramide is burned down to a 2-carbon chain, by a reaction analogous to β-oxidation, so that the compound eventually utilized by the mold is one containing the cyclohexyl-acetyl group instead of one containing the original cyclohexylbutyryl group.

*Example 4*

The sodium salt of cyclohexen-2-yl-penicillin represented by the following formula

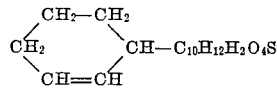

is obtained as follows: A culture medium is prepared as set forth in Example 1. To 5 liters of this culture medium, 0.85 g. of N-(2'-hydroxyethyl)-cyclohexen-2-yl-acetamide is added and the mixture is sterilized. The resulting medium is distributed in 200 ml. portions in 1-liter flasks, and each is inoculated with approximately 10 cc. of vegetative inoculum of *Penicillium chrysogenum* Q-176, and is incubated at 24° C. with aeration and shaking for about 50 hours. The broth is filtered to remove the mold mycelium. The filtered broth assays about 275 units per cc. and contains the desired cyclohexen-2-yl-penicillin in the form of a soluble salt. The cyclohexen-2-yl-penicillin salt is converted to the acid and obtained in amyl acetate solution by extraction of the cooled filtered broth with amyl acetate at about pH 2. It may be purified and recovered as the sodium salt by the recovery procedure of Examples 1 or 2.

*Example 5*

The preceding examples are repeated, save that other precursors are used, and corresponding other new penicillins are produced. The new penicillins which are so produced, and precursors which may be used to produce them, include the following:

| New Penicillin | Percursors which may be used to produce the new penicillin |
|---|---|
| cyclohexen-3-yl-penicillin | N-(2'-hydroxyethyl)-cyclohexen-3-yl-acetamide |
| cyclopenten-1-yl-penicillin | N-(2'-hydroxyethyl)-cyclopenten-1-yl-acetamide |
| cyclopenten-2-yl-penicillin | N-(2'-hydroxyethyl)-cyclopenten-2-yl-acetamide |
| 2-methylcyclohexyl-penicillin | N-(2'-hydroxyethyl)-2-methylcyclohexyl-acetamide |
| 3-methylcyclohexyl-penicillin | N-(2'-hydroxyethyl)-3-methylcyclohexyl-acetamide |
| 4-methylcyclohexyl-penicillin | N-(2'-hydroxyethyl)-4-methylcyclohexyl-acetamide |
| 2-methylcyclopentyl-penicillin | N-(2'-hydroxyethyl)-2-methylcyclopentyl-acetamide |
| 3-methylcyclopentyl-penicillin | N-(2'-hydroxyethyl)-3-methylcyclopentyl-acetamide |

*Example 6*

The new penicillins obtained in the form of their sodium salts may be converted to other salts in a number of ways. One way is as follows: An aqueous solution of the sodium salt, acidified to about pH 2, is extracted with an equal volume of an organic solvent, such as amyl acetate, ether, chloroform, or the like. The organic solvent solution, containing the new penicillin in acid form, is extracted with an aqueous solution containing the cation of the desired salt, for example, a solution of potassium hydroxide, calcium phosphate, ammonium hydroxide, or the like, at about pH 8.5. The aqueous extract contains the penicillin as the corresponding salt, for example, the potassium salt, the calcium salt, or the ammonium salt of the penicillin, and such salt is suitably recovered from the solution, as by drying in vacuo from the frozen state.

We claim as our invention:

1. A compound of the group consisting of a new penicillin acid and its sodium, potassium, calcium and ammonium salts, said acid being represented by the formula

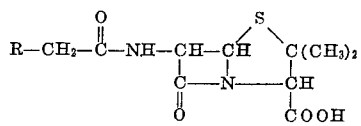

in which R represents a hydrocarbon radical of the group consisting of the cyclopentyl, cyclopentenyl, cyclohexyl and cyclohexenyl radicals, and the monomethyl derivatives thereof in which the methyl radical is positioned on a secondary carbon atom.

2. A new penicillin represented by the formula

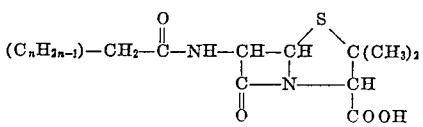

in which ($C_nH_{2n-1}$) is an unsubstituted cycloalkyl radical wherein $n$ represents an integer from 5 to 6 inclusive.

3. A new penicillin represented by the formula

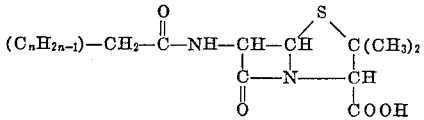

in which ($C_nH_{2n-3}$) is an unsubstituted cyclohexenyl radical wherein $n$ represents an integer from 5 to 6 inclusive.

4. Cyclopentyl-penicillin.
5. Cyclohexyl-penicillin.
6. Cyclopenten-2-yl-penicillin.

OTTO K. BEHRENS.
REUBEN G. JONES.
QUENTIN F. SOPER.
JOSEPH W. CORSE.

REFERENCES CITED

The following references are of record in the file of this patent:

UNITED STATES PATENTS

| Number | Name | Date |
|---|---|---|
| 2,479,296 | Behrens et al. | Aug. 16, 1949 |